Figure 1:
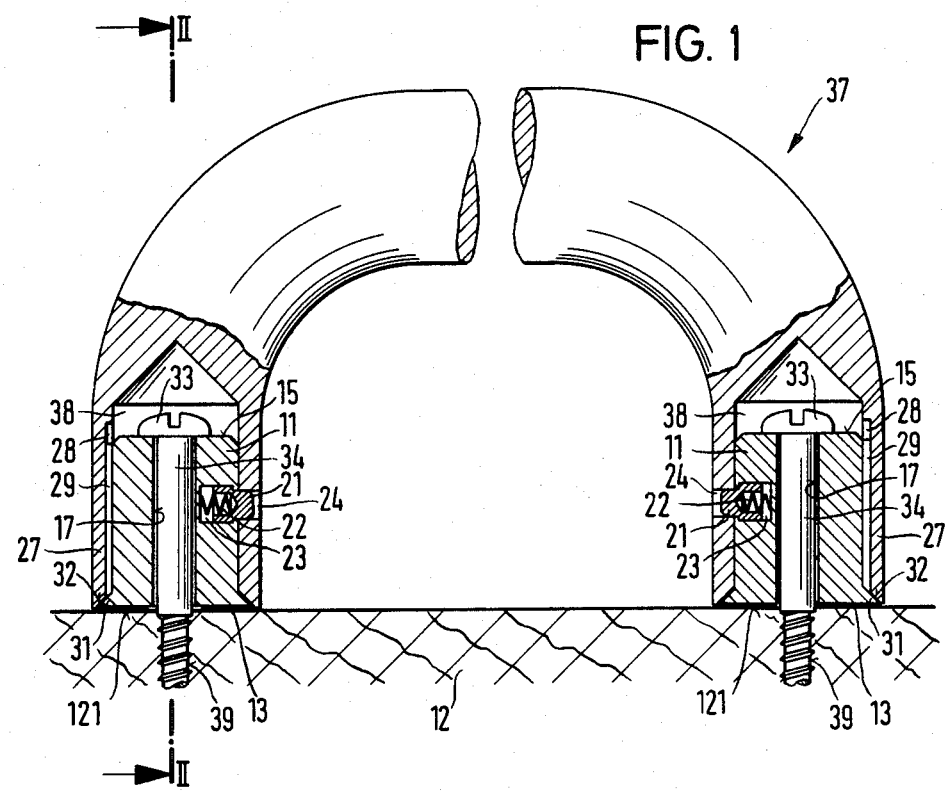

United States Patent [19]

Wilke

[11] Patent Number: 4,524,506
[45] Date of Patent: Jun. 25, 1985

[54] METHOD FOR ATTACHING AN ARTICLE TO A WALL

[76] Inventor: Rudolf Wilke, Marsberger Strasse 2, 3548 Arolsen, Fed. Rep. of Germany

[21] Appl. No.: 348,574

[22] Filed: Feb. 12, 1982

[30] Foreign Application Priority Data

Feb. 13, 1981 [DE] Fed. Rep. of Germany ....... 3105347

[51] Int. Cl.³ ............................................. B23P 11/02
[52] U.S. Cl. ....................................... 29/453; 29/445; 29/469; 29/526 R; 248/205.4; 248/221.3; 248/251; 156/92
[58] Field of Search ............. 29/526 R, 453, 469.5 R, 29/458, 464, 445, 469; 248/205.2, 205.3, 205.4, 205.5, 214, 320, 408, 321, 261, 201, 221.3, 251, 221.4; 156/91, 92

[56] References Cited

U.S. PATENT DOCUMENTS

| | | |
|---|---|---|
| 1,041,549 | 10/1912 | Winton et al. ............... 248/221.3 X |
| 2,455,606 | 12/1948 | Pleiss ............................ 248/221.4 X |
| 2,679,373 | 5/1954 | Henley ...................... 248/205.4 UX |
| 2,785,453 | 3/1957 | Wentz ........................... 248/221.3 X |
| 3,244,489 | 4/1966 | Parker .................................... 29/445 |
| 3,300,173 | 1/1967 | Kennedy, Jr. ................ 248/205.3 X |
| 3,384,333 | 5/1968 | Bohlman et al. ................... 248/251 |
| 3,482,809 | 12/1969 | McCall, Jr. .................. 248/205.3 X |
| 3,675,883 | 7/1972 | Holmes et al. ....................... 248/251 |
| 3,809,799 | 5/1974 | Taylor .......................... 248/205.3 X |
| 4,005,842 | 2/1977 | Lane ............................. 248/205.3 X |

Primary Examiner—Charlie T. Moon
Attorney, Agent, or Firm—Townsend & Townsend

[57] ABSTRACT

An article is attached to a wall by mounting the article on at least one and preferably two or more holders which are in turn screwed to the wall. Each holder has a self-adhesive layer at its end face adjacent the wall and at least one screw hole for fixing it to the wall. The arrangement is such that the holders can be provisionally mounted on the article and then pressed against the wall in the desired position. The self-adhesive layers then temporarily secure the holders to the wall so that the article can be removed leaving the holders in the desired position on the wall. The screw holes in the holders are then used as a drilling jig for drilling the attachment holes in the wall. Screws are then inserted into the attachment holes, if necessary using wall plugs, and the article is then remounted on the holders. Provision is made for finally securing the article to the holders, for example by the use of spring loaded pins. Several variants of the invention are described including particularly advantageous arrangements using two-part pedestals for the holders with the pedestals fitting into complementary sockets in end parts of the article. The invention is preferably used for attaching articles such as hand grips, towel rails etc.

5 Claims, 24 Drawing Figures

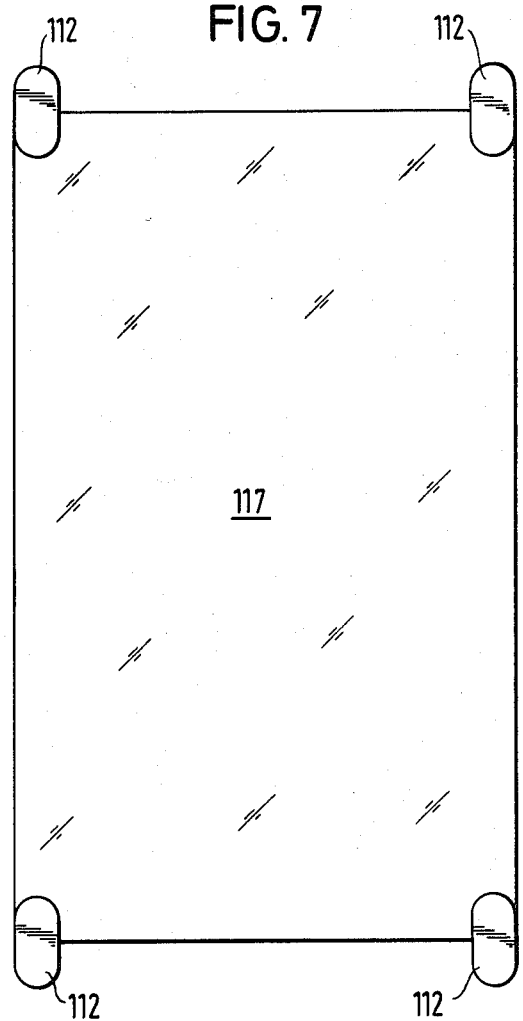
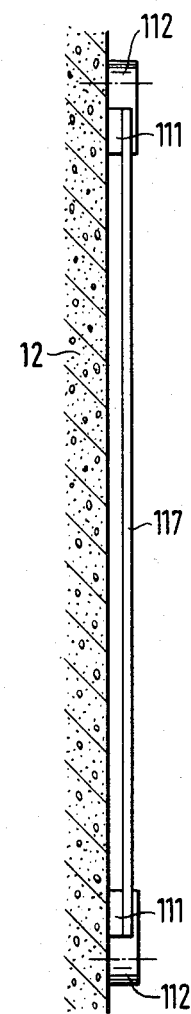
FIG. 7
FIG. 8
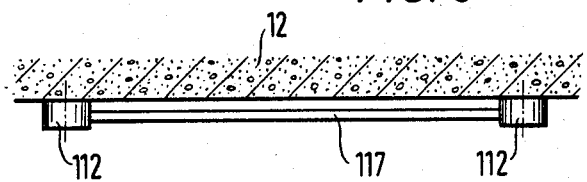
FIG. 9

FIG. 11
FIG. 12
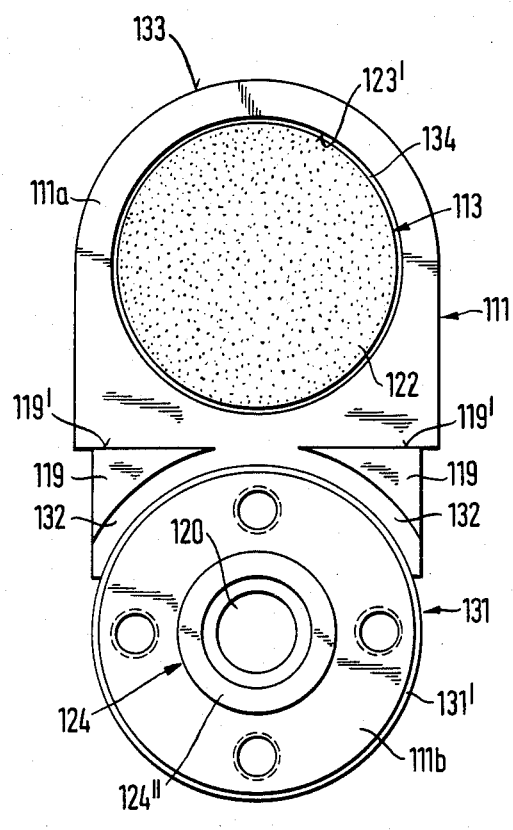
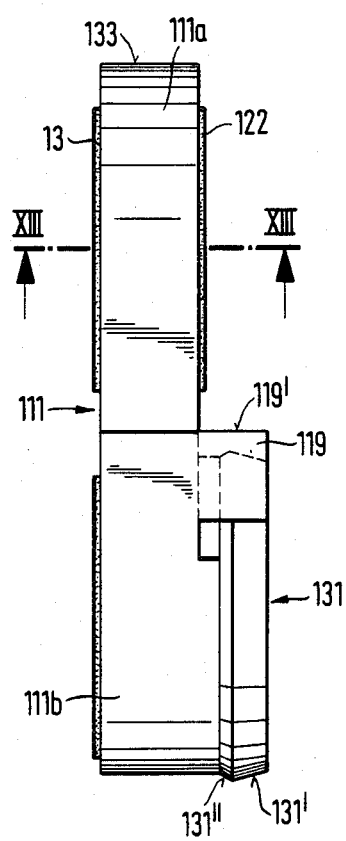

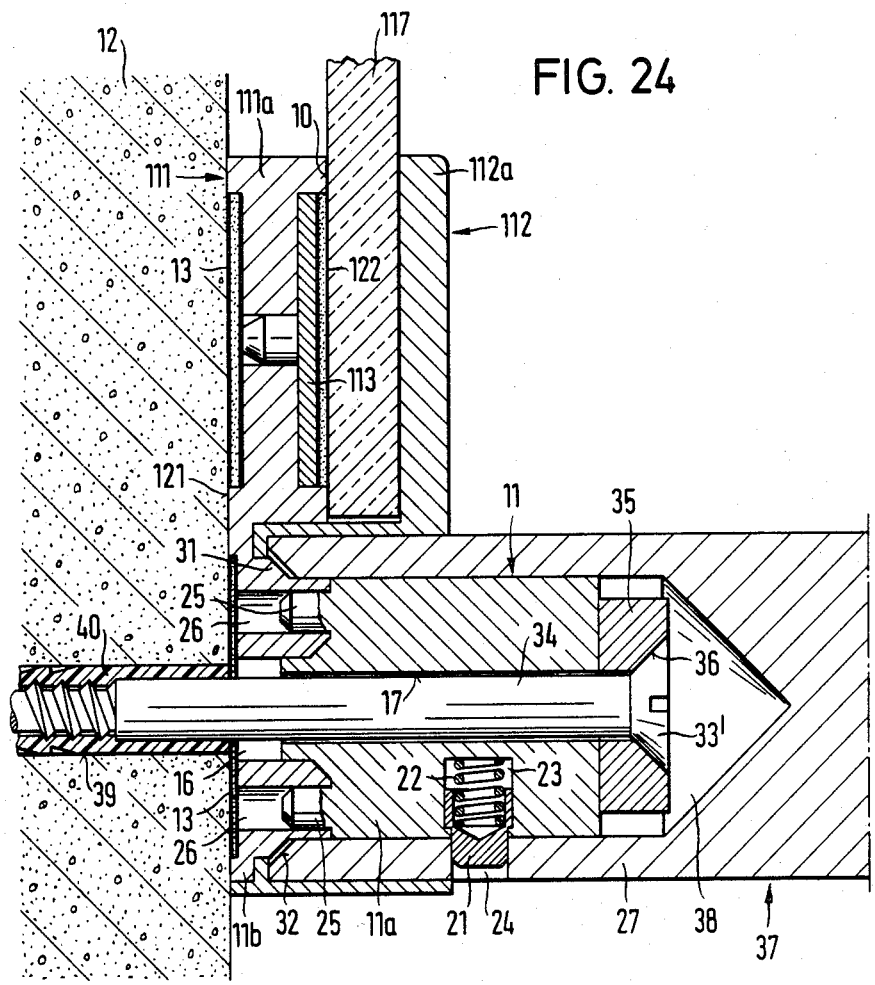

METHOD FOR ATTACHING AN ARTICLE TO A WALL

The invention relates to a method of attaching at least one article to a wall by means of one or more holders which can be fixedly secured to the wall and which hold the article or articles. The invention also relates to an article for fastening to a wall and having holders with attachment holes for carrying out this method.

A wall plate for securing a soap or tooth-paste holder or the like to a wall by means of an attachment device between the plate and the wall is already known from German patent application No. P 19 47 393. In this known arrangement the holder is attached to the front side of the wall plate by means of two diametrically opposite projections which stand proud of the front wall of the wall plate. One or more adhesive patches which are adhesive on both sides are provided on the rear side of the thin but solid synthetic wall plate. The layer of adhesive on one side of the adhesive patch (or patches) is used to secure the patch to the wall plate whereas the adhesive layer on the other side of the patch (or patches) serves to stick the patch and thus the wall plate to the wall. The self-adhesive layer or layers at the wall side are covered prior to use with a protective foil which can be peeled off prior to use. Such adhesive attachments are however not suitable for permanently mounting articles on a wall because they can only carry restricted loads and because the bond with the wall is decisively influenced by the surface characteristics of the wall. Moroever, the adhesive layers dry out in the course of time so that the bond of the holder to the wall gradually weakens.

The object of the present invention is thus to provide a method and an article of the initially named kind by means of which the attachment holes for the holders can be drilled in the wall at exactly the right position without the need to use a special drilling jig so that, after screwing the holders to the wall, these are located in exactly the right position relative to the article which is to be secured thereon.

In order to satisfy this object it is envisaged, in accordance with the method of the invention, that the holder or holders is/are first of all provisionally secured to the article or articles in the final position; that one or more covered, self-adhesive layers arranged on the wall contact surface of the or each holder is/are bared; that the article or articles with the holder or holders provisionally secured thereto is/are brought into a predetermined position on the wall, whereby the holder or holders adheres/adhere to the wall by means of the self-adhesive layer or layers; that the article or articles is/are then removed from the holder or holders which remains/remain adhered to the wall; that the required attachment hole or holes is/are drilled in the wall using the holder or holders adhering to the wall as drilling jig; that the holder or holders is/are finally screwed to wall; and that the article or articles is/are secured to the holder or holders in the final position.

An article in accordance with the invention for carrying out this method is so constructed that the holders and/or the article(s) have means for provisionally securing the holders to the article; and that the holders have one or more covered, self-adhesive layers, which can however be bared, on the wall contact surface, with said means for provisionally securing the holders to the article allowing the article to be released from the holders without releasing the holders from a wall to which they are adhered.

Thus, in accordance with the invention, the self-adhesive layers are only used to provisionally attach the holders to the wall by means of the article itself and the holders then temporarily take over the roll of a drilling jig to the extent that the holes required in the wall are drilled through the attachment holes in the holders. After this has been done the holders can be secured finally to the wall in the usual manner by means of screws, if necessary after previously inserting a wall plug into the drilled hole. The self-adhesive layers then still adhere to the wall but no longer exert any significant retaining function. They do however ensure that lateral displacement of the holders, which would result in malalignment, is avoided during tightening of the screws, particularly if these are not absolutely accurately centered, and also avoid rotation of the holders during tightening of the screws.

The self-adhesive layer is preferably formed on an adhesive tape which is adhesive on both sides and has a thin foam carrier layer, preferably of only 0.3 to 0.6 mm thickness, arranged between the layers of adhesive. The adhesive tape is usefully stuck into recesses in the wall contact surfaces of the holders.

The rotational stability of the adhesive bond to the wall can also be improved by manufacturing the holders in hard polyethylene or polyoxymethylene. This choice of material results in a low coefficient of friction between the holders and the drill. The lubricating properties can be improved even better by greasing the holes. Furthermore, the holes in the pedestals should be significantly larger than the diameter of the drill.

Figure 2:
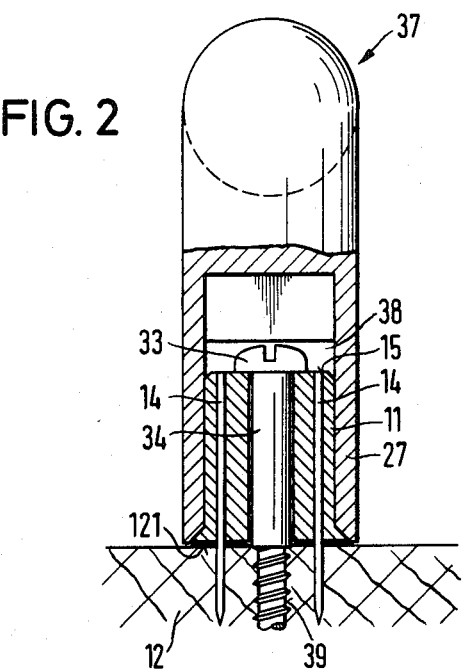
Figure 3:
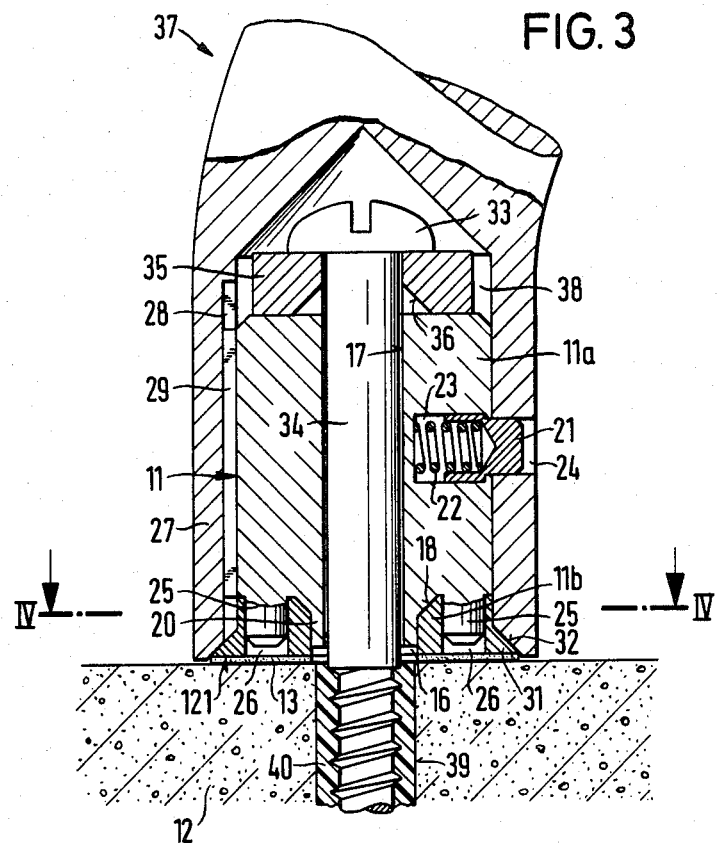
Figure 4:
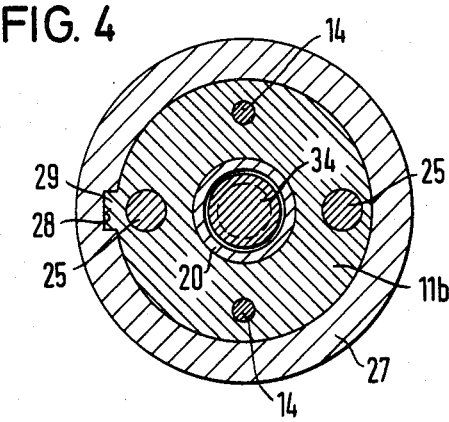
Figure 5:
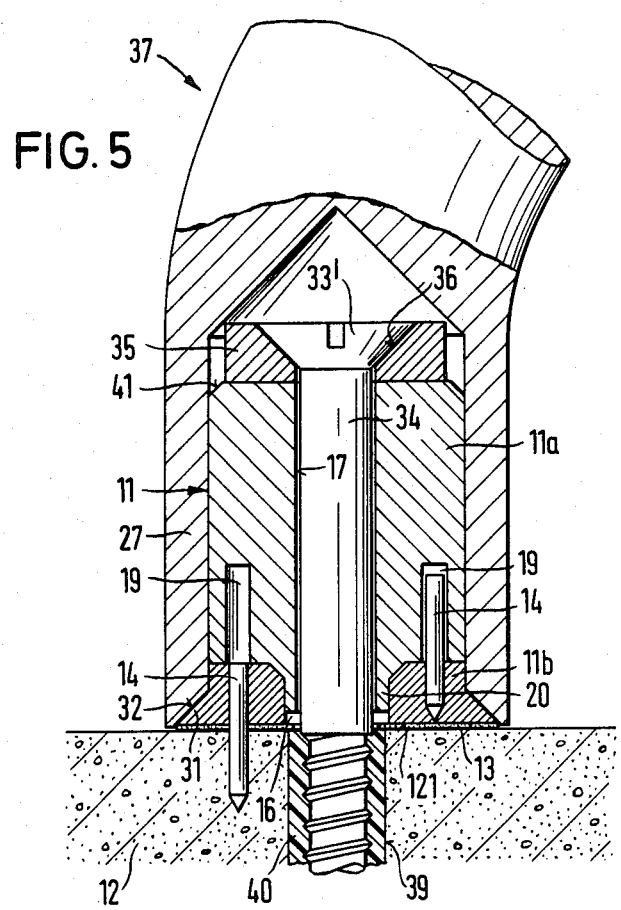
Figure 6:
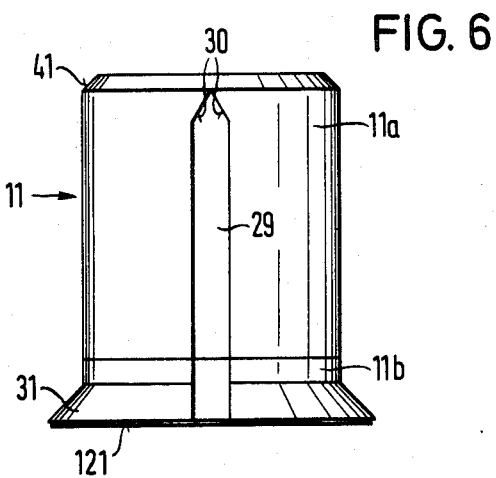
Figure 10:
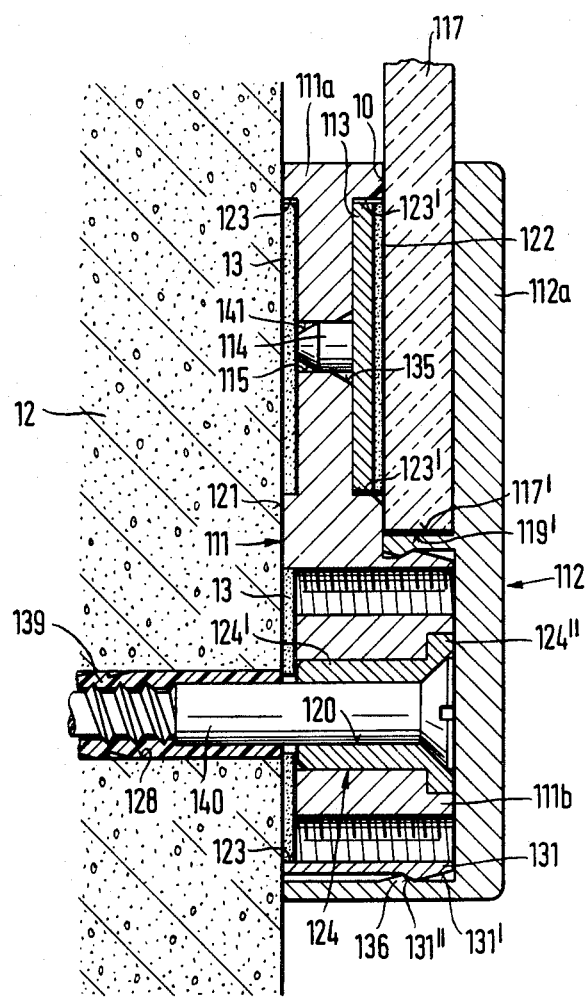
Figure 13:
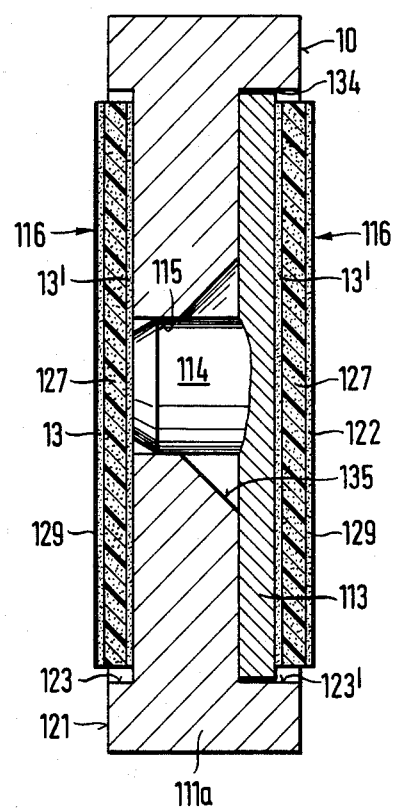
Figure 14:
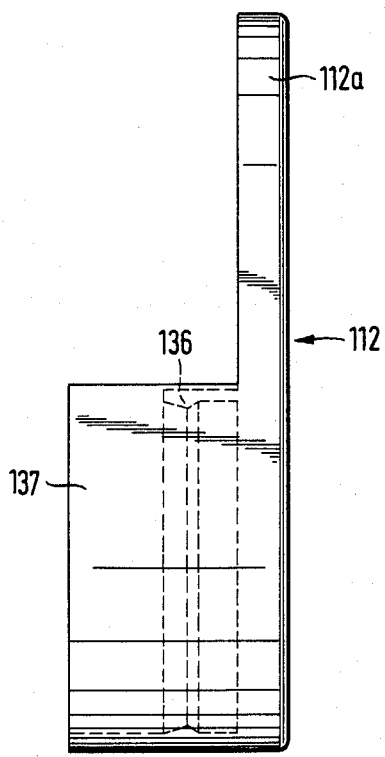
Figure 15:
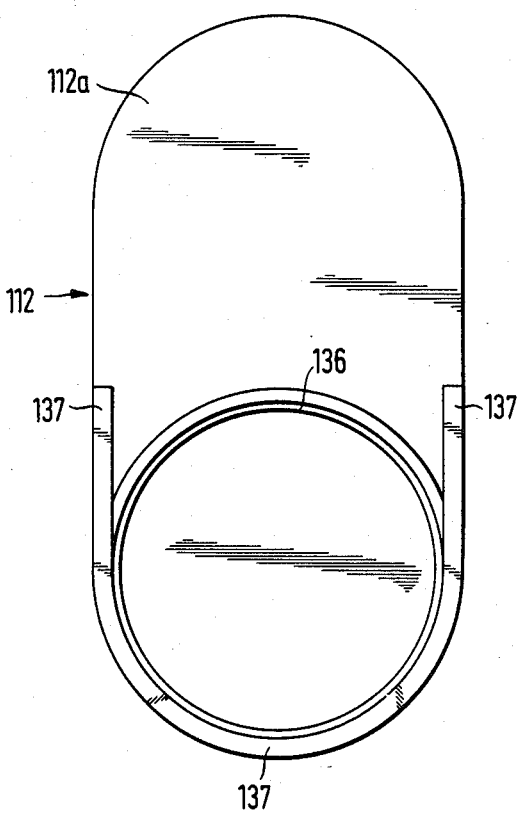
Figure 16:
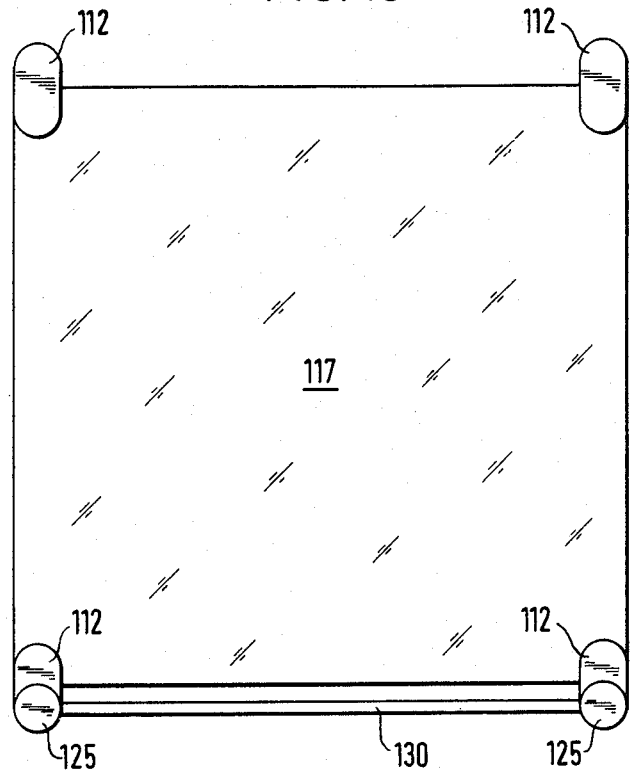
Figure 17:
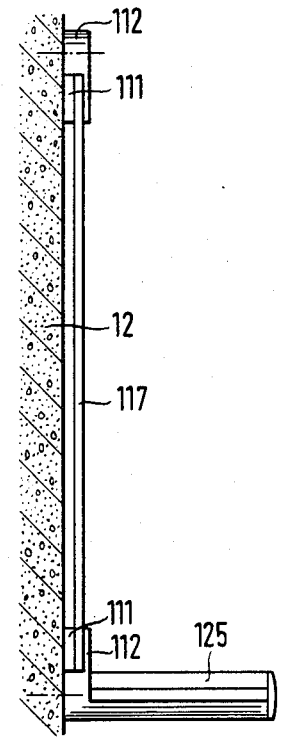
Figure 18:
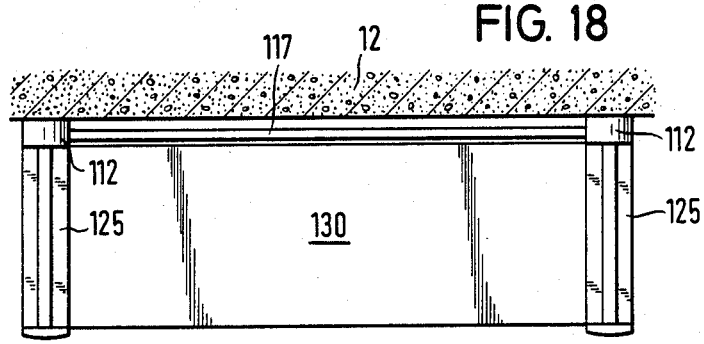
Figure 19:
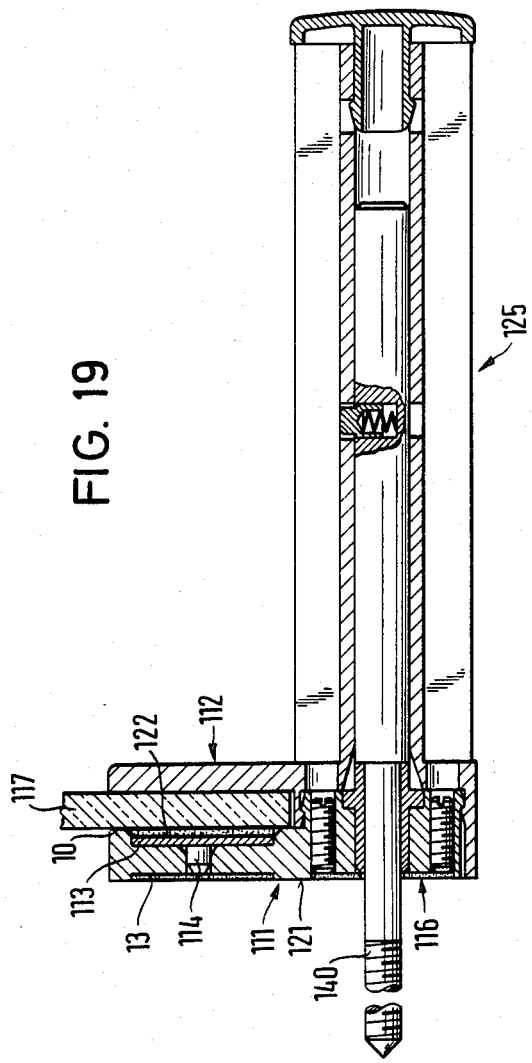
Figure 20:
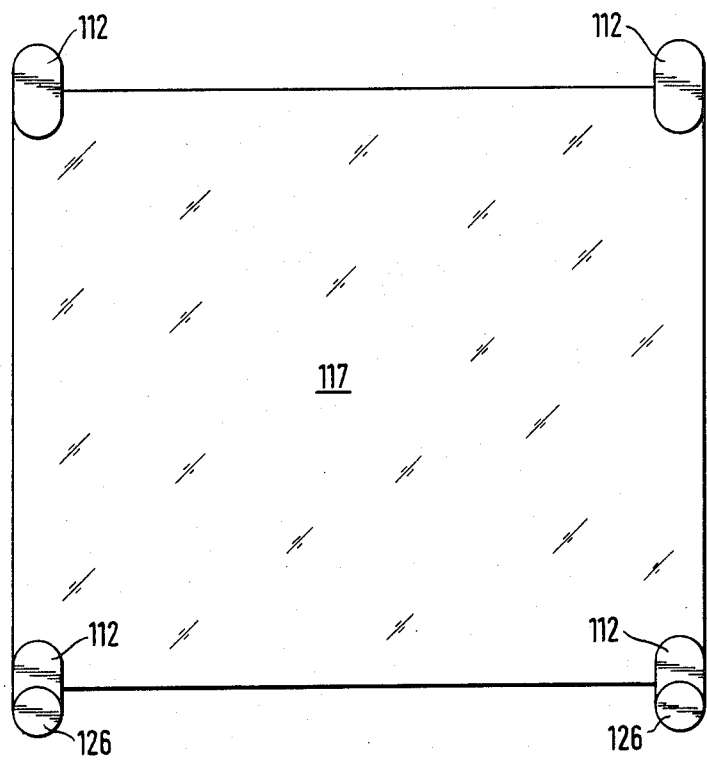
Figure 21:
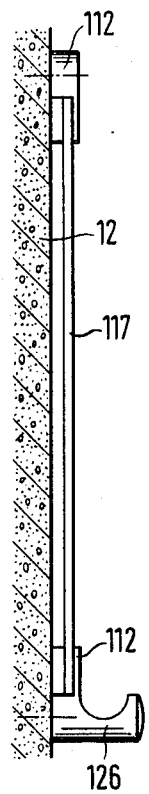
Figure 22:
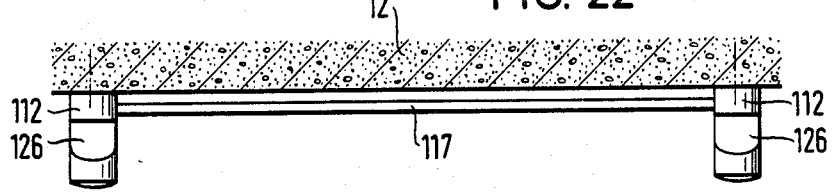
Figure 23:
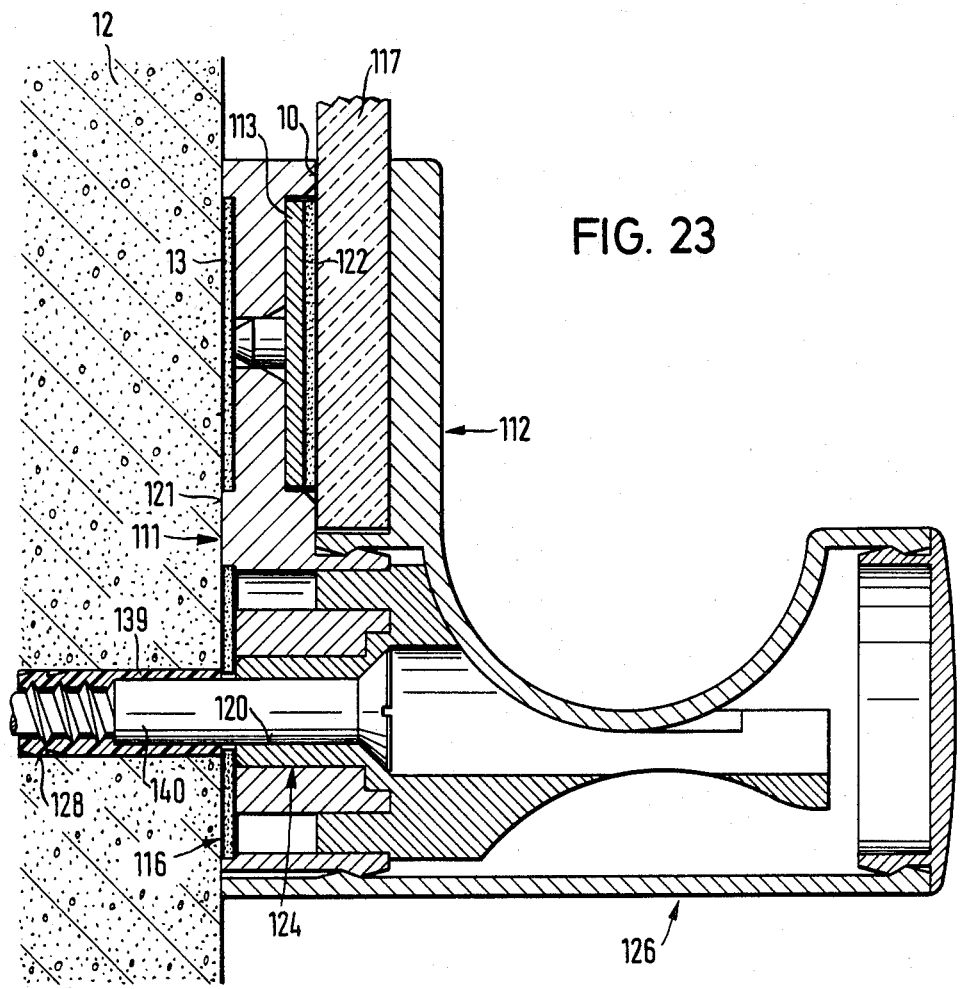

The invention will now be described in the following by way of example only and with reference to the accompanying drawings which show:

FIG. 1 a partially sectioned plan view of a fitting in the form of a handtowel rail having pedestals in accordance with the invention, FIG. 2 a partially sectioned view on the line II—II of FIG. 1, FIG. 3 a partially sectioned plan view analogous to that of FIG. 1, but to an enlarged scale, of a fitting having a two-part pedestal and, in addition, a washer provided between the upper part of the socket and the head of the screw, FIG. 4 a section on the line IV—IV of FIG. 3, FIG. 5 a similar, partly sectioned plan view of that of FIG. 3, but illustrating a counter sunk screw in place of a round head screw to secure the parts of the pedestal and two attachment nails of which the left hand nail is driven in and the right hand nail has not yet been driven in, FIG. 6 a side view of the pedestal used in the embodiment of FIG. 5 seen in the direction of the tongue 29 used to prevent rotation of the pedestal parts, FIG. 7 a schematic front view of a mirror secured to a wall with four wall holders in accordance with the invention, FIG. 8 a partially sectioned side view of the article of FIG. 7, FIG. 9 a partially sectioned plan view of the article of FIG. 7, FIG. 10 an enlarged, partly sectioned side view of a single wall holder in accordance with the invention showing the state with the wall holder screwed to a wall and with a mirror positioned thereon, FIG. 11 a plan view of the lower part used with the wall holder of FIG. 10, FIG. 12 a side view of the article of FIG. 11, FIG. 13 a purely schematic section, which is somewhat enlarged but not not true to scale, along the line XIII—XIII of FIG. 12, FIG. 14 a side view of the upper part used with the wall holder of FIG. 10, FIG. 15 a rear view of the upper part of FIG. 14, FIG. 16 a schematic plan view of a mirror mounted using the wall holders of the invention, with the two lower wall holders simultaneously acting as support arms for a shelf, FIG. 17 a side view of the article of FIG. 16, FIG. 18 a plan view of the article of FIG. 16, FIG. 19 a partly sectioned enlarged view of one of the two lower wall holders of the embodiment of FIGS. 16 to 18 with a forwardly projecting support arm, FIG. 20 a schematic front view of a mirror attached by four wall holders in accordance with the invention to a wall, with the two lower wall holders simultaneously constructed as handtowel hooks, FIG. 21 a side view of the article of FIG. 20, FIG. 22 a plan view of the article of FIG. 20, FIG. 23 a sectioned enlarged side view of one of the lower wall holders of the embodiment of FIGS. 20 to 22, and FIG. 24 a partly sectioned side view of a fitting with a mirror holder attached to a wall.

As seen in FIG. 1 a handtowel rail 37 has securing end parts 27 bent perpendicular to a wall 12 at its two ends. The securing end parts are each provided with a hollow cylindrical opening or socket 38 which opens towards the wall 12. The hollow cylindrical opening 38 preferably has a constant circular cross-section, can however also be of oval or polygonal cross-section.

The hollow cylindrical opening 38 sits on a pedestal 11 which is of complementary shape and which forms a holder. A screw hole 17 through which a mounting screw 34 with a round head 33 passes is provided in the center of the pedestal. The mounting screw 34 is screwed directly into the wall 12 and indeed into a drilled hole 39 which extends at right angles to the surface of the wall 12. When the screw 34 has been tightened, the lower flat surface of the screw head 33 rests on the upper end face 15 of the pedestal 11 and presses the pedestal hard against the wall 12.

At its end facing the wall 12 the pedestal 11 has a conically divergent portion 31 which contacts a conical recess of complementary shape in the securing end part 27. The conically divergent portion 31 does not however extend beyond the outer diameter of the securing end part 27 so that this part can extend right up to the wall 12. There remains, at most, a trivial gap between the annular end face of the securing end part 27 and the wall 12.

In accordance with the invention the wall contact surface 121 of the pedestal 11 is provided with a self-adhesive layer 13 which is preferably formed on an adhesive band 116 (FIG. 13) which is adhesive on both sides. The adhesive band is adhered to the wall contact surface 121 of the pedestal 11 with the self-adhesive layer 13 being directed towards the wall 12. At the center the self-adhesive layer 13 has a passage aligned with the scew hole 17 for the screw 34. The external diameter of the circular adhesive layer 13 corresponds to the external diameter of the end face of the pedestal 11 which faces the wall 12.

A retaining pin 21 acted on by a compression coil spring 22 is arranged in a lateral recess 23 of the pedestal 11. The retaining pin 21 engages in a radially directed locking bore 24 of the securing end part 27 and thus connects the securing end part 27 of the handtowel rail 37 securely to the pedestal 11 in the axial direction of the screw 34.

As seen in FIG. 2 two thin steel nails 14 are provided on diametrically opposite sides of the pedestal 11 and are preferably displaced through 90° relative to the retaining pin 21. The thin steel nails 14 are driven into the wall 12 and thus secure the pedestal 11 to the wall 12 in addition to the adhesive layer 13.

The mounting of the handtowel rail illustrated in FIGS. 1 and 2 is effected as follows:

First of all the pedestals 11 are arranged in the openings 38 of the securing end parts 27, without the screws 34, in the manner shown in FIGS. 1 and 2. A protective foil 129 (FIG. 13) which preferably covers the self-adhesive layer 13 is then withdrawn so that the adhesive layer 13 is laid bare. The handtowel rail 37 is now positioned on the wall 12 at the position where it is to be attached and pressed against the wall. As a result the pedestals 11 adhere securely to the wall 12.

The retaining pins 21 are now passed inwardly by means of a suitable tool so that the axially secure connection between the pedestals 11 and the securing end parts 27 is annulled. The handtowel rail 37 together with the securing end parts 27 can now be lifted from the pedestals 11 and the pedestals 11 remain adhered to the wall on their own.

A drill can now be passed through the screw hole 17 to drill the fastening hole 39 in the wall 12. If a wall plug is to be used the diameter of the screw hole 17 must be somewhat larger than illustrated. For a wall 12 of wood the diameter of the screw hole 17 illustrated in FIGS. 1 and 2 is sufficient to bore the hole 39 in the wall 12 which is required to secure the screw 34.

After the hole has been bored the screws 34 are screwed in, in the illustrated manner, until the sockets are rigidly pressed against the wall 12, and thus finally fastened, by the screw heads 33.

If, in addition, the nails 14 illustrated in FIG. 2 are present then these nails are driven into the wall 12 with a hammer prior to boring the holes 39. Prior to this the nails do not project through the adhesive end face 13 but project instead from the rear surface 15 into the upper part of the opening 38 which must be correspondingly dimensioned. The adhesion of the pedestals 11 is thus not in any way hindered by the nails 14.

On the other hand, the nails 14 after being driven in as shown in FIG. 2 ensure a significantly better hold of the pedestal 11 during drilling of the securing holes 39.

After the pedestals 11 have been secured in the described manner they exhibit the accurate alignment required for accurate fitting of the handtowel rail 37; so that the securing end parts 27 can now be pushed effortlessly over the pedestals 11 until the retaining pins 21 snap into the locking bores 24.

The conical recesses 32 at the ends of the securing end parts 27 which face the wall act advantageously as run-up ramps for the retaining pins 21 so that these retaining pins are automatically depressed in order then finally to snap into the locking bores 24, on pushing the securing end parts 27 into position.

In order to obtain a troublefree angular alignment between the securing end parts 27 and the pedestals 11 there is provided, in the inner wall of each securing end part 27, a groove 28 which extends parallel to the screw 34 and in which a tongue 29, provided on the outer wall of the associated pedestal 11, engages in the manner shown in FIG. 1. The angular alignment between the handtowel rail 37 and the pedestal 11 required to allow the retaining pin 21 to snap into the locking bore 24 is thus automatically ensured.

In the following embodiments the same reference numerals relate to the same parts as in the embodiment of FIGS. 1 and 2.

As seen in FIGS. 3 and 4 the pedestal 11 is subdivided into a relatively long upper part 11a and a relatively thin disk-like part 11b.

The lower part 11b of the pedestal has the conically diverging portion 31 which cooperates with the conical recesses 32 in the securing end parts 27. In addition, the lower part of the pedestal has a wall plug bore 16 with a larger diameter than the screw hole 17 provided in the upper part 11a of the pedestal the diameter of which corresponds substantially to that of the screw 34.

A central hollow journal 20 of the pedestal upper part 11a engages in the wall plug bore 16 to center the two parts of the pedestal 11.

In order to prevent rotation between the two parts 11a, 11b of the pedestal, pins 25, which project towards the wall 12 on diametrically opposite sides of the upper part 11a of the pedestal, engage in complementary bores 26 of the lower part 11b of the pedestal. The tongue 29 for preventing rotation between the pedestal 11 and the securing end part 27 is provided both on the lower part 11b and on the upper part 11a of the pedestal. The tongue 29 once again engages in a groove 28 arranged in the inner wall of the securing end part 27.

If provided the securing nails 14 are arranged displaced relative to the pins 25 by 90° in the sense of FIG. 4.

In addition a washer 35 having a bore with a diameter corresponding to the screw holes 17 is arranged in the embodiment of FIG. 3 between the screw head 33 and the pedestal upper part 11a. A conical depression 36 is however provided in one end face so that a counter sunk screw can also act on the washer 35 without problem as shown in FIG. 5 after turning over the washer 35 relative to the illustration of FIG. 3.

The wall plug bore 16 of the lower part of the pedestal 11b also has a lead in cone 18 to simplify the introduction of a drill bit.

The mounting of the embodiment of FIGS. 3 and 4 is carried out as follows:

First of all only the lower parts 11b of the pedestals are inserted into the securing end parts 27, i.e. without the screws 34, without the washers 35 and without the upper parts 11a of the pedestals. Care should be taken to ensure a small degree of adhesion and/or jamming between the lower parts 11b of the pedestals and the securing end parts 27 such as already results from the mating conical portions 31 and 32. After removing the protective foils from the self-adhesive layers 13, which in this case are provided on the wall contact surfaces 121 of the lower parts of the pedestal 11b, the fitting 37 is once again pressed against the wall at the intended position which results in the lower parts 11b of the pedestals sticking to the wall. If the fitting 37 is now withdrawn the lower parts 11b of the pedestals remain adhered to the wall, and indeed with the correct angular alignment as a result of the tongues 29 and grooves 28.

It is important to note that this initial part of the mounting operation is carried out with only the lower parts 11b of the pedestals engaged in the corresponding sockets of the fitting. This has two principal advantages. First of all, it is not necessary to depress retaining pins in order to separate the fitting from the lower parts of the pedestals, which can prove ackward particularly if two or more locking pins are to be depressed at the same time as the fitting is pulled away from the pedestals. Secondly, it is easy to provide holes in the lower parts of the pedestals of a size suitable to accommodate a drill of the diameter required to fit a wall plug.

After the wall plug bore 39 has been drilled the wall plug 40 can be introduced into the wall 12. The lower parts 11b of the pedestals thus serve solely as a drilling jig.

If a wall plug 40 is not necessary, for example in the case of a wooden wall 12, the upper part 11a of the pedestal is placed on the lower part 11b of the pedestal prior to the drilling operation. A wood drill of smaller diameter can now be passed through the screw hole 17 and used to drill the securing hole in the wall 12. In this case the upper part 11a of the pedestal temporarily takes over the function of a drilling jig.

After the bores have been accurately drilled in this way the screws 34 are screwed in, in the manner shown in FIGS. 3 and 4, after the washers 35 have been placed the right way up on the upper parts 11a of the pedestals. After tightening the screws 34 their heads 33 press the pedestals 11 against the wall 12 via the washers 35 so that a troublefree fastening is present. The fitting 37 can now be placed over the accurately fitted pedestals 11 so that the retaining pins 21 snap into the locking bores 24.

The axially locked connection between the securing end parts and the pedestals 11 can also be realized by suitable means other than the retaining pins 21.

In the embodiment of FIG. 5 the screw 34 has a countersink head 33 which engages in the correspondingly shaped conical depression 36 of the washer 35. FIG. 5 also shows how the additional securing nails 14 are arranged on division of the pedestal 11 into two pedestal parts 11a and 11b. The nails 14 can, in this case, be significantly shorter because they only have to be arranged in the relatively thin lower part 11b of pedestal. When the upper part 11a of the pedestal is in place, for example during transport, the nails 14 project in the manner shown to the right of center in FIG. 5 into reception passages 19 in the pedestal upper part 11a which extend parallel to the screw 34. As soon as the pedestal upper part 11a is removed for assembly the projecting ends of the nails 14 are outwardly free, so that they can be driven in with a hammer after adhering the pedestal lower part 11b to the wall 12 in the manner shown pictorially in FIG. 5 to the left of the screw 34. With the nails 14 driven in, the lower part 11b of the pedestal is even more reliably protected against rotation or other displacement than would be possible with the self-adhesive layer 13 alone.

If the additional security provided by the nails 14 is not required, or not possible because of the characteristics of the wall 12 (for example a tiled wall), the nails 14 remain in the retracted position illustrated in FIG. 5 to the right of the screw 34. On mounting the pedestal upper part 11a the projecting ends of the nails 14 are once again accommodated by the passages 19. As shown in FIG. 6 the tongue 29 has two symmetrical run-up ramps 30 at its end remote from the wall 12 so that a degree of rotation by way of correction is possible if a small degree of angular malalignment exists between the securing end parts 27 and the pedestal 11.

In order to facilitate the positioning of the securing end parts 27 on the pedestals 11, a small lead in taper 41 (FIGS. 5, 6) can also be provided at the end of the pedestal 11 remote from the wall 12.

FIGS. 7 to 9 show, in front view, side view and plan view, a mirror 117 secured to the wall 12 by four holders each of which consists of a lower part 111 and an upper part 112.

As seen in FIGS. 10 to 12 the lower part 111 of the wall holder of the invention consists of a support region 111a which is rounded at one end and connected by two parallel straightline sides with a part 111b which is screwed to the wall. As shown in FIG. 11 the support region 111a and the parts 111b form an elongate shape having at both ends semicircular rounded edges which are connected together via parallel straightlined sides.

A screw hole 120 is provided in a reducing sleeve 124 at the center of the part 11b. The axis of the screw hole lies at right angles to the lower part 111 and the wall 12 (FIG. 10) to which the lower part is to be screwed. The reducing sleeve 124 has the shape shown in detail in FIG. 10 with a cylindrical region 124' arranged in a bore of the part 111b, and also a broadened head 124" which is arranged in a corresponding recess in the surface of the lower part 111. In this way the reducing sleeve 124 can easily be withdrawn forwardly from or reinserted into the bore in the lower part 111.

As shown in FIGS. 10 to 12 the part 11b has a snap bead 131 which extends around its front end and which has a conical inclined surface 131 diverging at a relatively shallow angle from the front to the rear, followed by a somewhat steeper, rearwardly converging, inclined surface 131". Abutments 119 radially spaced from the annular bead 131 are located on the side facing the support region 11a and an annular intermediate space 132 is present between the abutments and the part 111b. The upper surfaces of the abutments 119 in FIGS. 11 and 12 serve as abutment surfaces 119' for the mirror 117 (FIGS. 7 to 9) which is to be carried by the holder. It is thus important that the abutment surfaces 119' are substantially flat and extend at right angles to the longitudinal axis of the lower part 111. The abutments 119 have essentially the wedge-like form shown in FIG. 11.

In the support region 111a the lower part is set back noticably from the part 11b which carries the annular bead 131. In accordance with the invention a circular recess 123' (FIGS. 10, 11) is provided in the front surface of the support region 111a concentric with the circular edge 133 of the support region 111a.

A circular adhesive plate member 113 (FIGS. 10 to 13) is inserted, in accordance with the invention, in the recess 123' with play 134 on all sides. The adhesive plate member 113 is provided with a concentric journal 114 at its rear side. This journal extends through a bore 115 which passes from the recess 123' to a further circular recess 123 provided on the opposite side of the lower part. The journal 114 extends fractionally into the recess 123 which is concentric with the recess 123'. In order to facilitate the introduction of the journal 114 into the bore 115 the bore is provided with a lead-in funnel 135 at its front side.

As shown in FIG. 13 a circular adhesive tape or patch 116 is stuck to the circular surface of the plate member 113 on the side remote from the journal 114 and is of corresponding size. The adhesive patch 116 which, starting from the plate member 113 consists of a self-adhesive layer 13' a foam body 127, a further self-adhesive layer 122 and a protective foil 129 located thereon. As can be seen from FIG. 13 in particular, the foam body 127 extends by approximately one half of its thickness beyond the front surface of the support region 111a.

A similar double-sided adhesive patch 116 comprising an inner self-adhesive layer 13', a foam body 127, an outer self-adhesive layer 13 and a protective foil 129 arranged thereon it is also provided in the oppositely disposed recess 123. The adhesive patches 116 are preferably identically constructed of the same material and are expediently used in all the described embodiments.

As shown in FIG. 10 a recess 123 is also provided in the rear side of the part 111b around and concentric to the screw hole 120. A double-sided self-adhesive patch with a self-adhesive layer 13 which is constructed in the same way as the patches 116 of FIG. 13 is provided in this recess 123. The three adhesive patches are adhered into the recesses 123 and to the plate member 113 by means of the inner adhesive layers 13'.

As shown in FIG. 10 an upper part 112 shown in detail in FIGS. 14 and 15 is positioned on the lower part 111 which is shown in detail in FIGS. 11 and 12. In the rear view of FIG. 15 it can be seen that the upper part 112 has a shape which corresponds to that of the lower part 111. The upper part 112 is provided, in the vicinity of the annular bead 131, with a mating snap ring 136 which, as shown in FIG. 10, can be resiliently snapped over the annular bead 131. Lower and partly laterally extending walls 137 cover the outside of the parts 111b. From the functional point of view the important feature is however the lug 112a which projects from the mating snap ring 136 parallel to the surface of the mirror 117. As shown in FIG. 10 this lug presses the edge of the mirror 117 against the support region 111a and the plate member 113.

The mounting of the mirror holder of the invention takes place as follows:

First of all the front side of the mirror 117 is laid on a base, for example a table. Four lower parts 111 are now placed onto the mirror 117 from the rear at the four corners in the arrangement shown in FIGS. 7 to 9, having first removed the protective foils 129 from the adhesive patches 116 so as to bare the self-adhesive layers 122. The adhesive patches 113 now adhere firmly to the rear side of the mirror 117. Furthermore, each of the journals 114 extends up to the inner adhesive layer 13' of the adhesive patch 116 (FIG. 13) so that each of the lower parts 111 is also fastened to the mirror 117 by adhesion. When placing the lower parts 111 care must be taken that the abutment surfaces 119 contact the outer edges 117' of the mirror.

The protective foils 129 are now removed from the rear adhesive patches 116 so that the outer self-adhesive layers 13 are bared. The mirror 117, together with the four lower parts 111 which are adhered thereto, is now brought to the correct position on the wall 12 (FIGS. 7 to 9). As soon as this has been done the four lower parts 111 are pressed firmly against the surface of the wall 12. As a result the lower parts 111 adhere firmly to the wall by means of the outer adhesive layers 13. The projecting foam body 127 of FIG. 13 allows any unevenness of the wall to be compensated for.

If the mirror 117 is now withdrawn forwardly the relatively weak points of adhesion between the pins 114 and the inner adhesive layers 13' release. The plate members 113 thus remain attached to the mirror 117, whereas the lower parts 111 remain adhered to the wall 12.

The lower parts 111 which are sticking to the wall now serve as a drilling jig for making the securing bores 128 (FIG. 10) in the wall 12. If, as shown in FIG. 10, a wall plug 139 is to be used, the reducing sleeve 124 must first of all be withdrawn from the lower part 111. After having done this the bore 128 for the wall plug 139 can be drilled with a correspondingly larger drill. The reducing sleeve 124 is then reinserted. A screw 124 can now be passed through the screw hole 120 and screwed into the wall plug 139 until, as shown in FIG. 10, the lower part 111 is secured by the screw 140 to the wall 12. The adhesive layers 13 now only function to counter rotation of the lower part 111 around the axis of the screw 140.

As soon as all four lower parts 111 they are accurately positioned in this manner the mirror 117 with the plate members 113 still attached thereto can be moved into position. In doing this the journals 114 pass via the lead in funnels 135 into the bores 115. The ends of the journals 114 should also be provided with end cones 141 as shown in FIG. 10 to facilitate their introduction into the respective bores. The plate members 113 are thus inserted in a simple manner and without requiring any particular care on the part of the operator into the recesses 123'. The clearance 134 (FIGS. 12 and 13) provided around each of the plate members also plays an important roll in facilitating the introduction of the plate members into their respective recesses.

After the mirror 117 has been placed in this way without difficulty on the four lower parts it is only necessary to move the upper parts 112 of FIGS. 14 and 15 axially into position on the respective lower parts 111 until the counter snap rings 136 of FIG. 10 snap behind the respective annular beads 131. In doing this the support lugs 112a now contact the front side of the mirror 117 and securely attach the mirror to the lower parts 111.

As a result of the contact pressure produced by the screws 140 the wall contact surfaces of the lower parts 111 now fit closely against the surface of the wall 12.

It is possible to release the mirror 117 at any time by prising the upper part 112 from the lower part 111 by means of a suitable tool. The mirror 117 can then be removed forwardly, without effort, together with the plate members 113 which are adhered thereto. The danger of the mirror 117 prematurely falling out during dismantling is prevented by the light adhesion of the journals 114 to the inner self-adhesive layer 13'. The corresponding light adhesion of the plate member 113 to the part 11b can also be effected by other means, for example a light press fit of the journal 114 in the bore 115 or by a snap connection.

After all the lower parts 111 have been finally secured, the mirror 117 has been positioned and the upper parts 112 have been snapped into place the mirror 117 is secured to the wall 12 in the manner shown in FIGS. 7 to 9. It is important that an intermediate space exists between the mirror 117 and the surface of the wall 12 through which ventilation of the rear side of the mirror 117 can take place.

The attachment of a mirror in accordance with the invention is particularly advantageous for tiled walls where the advantages of the lower parts 111 of the invention, which at as drilling jig, are particularly beneficial.

FIGS. 16 to 18 show views similar to FIGS. 7 to 9. However, the length to width ratio of the mirror is somewhat different and the two lower wall holders each have an upper part 112 with a respective forwardly extending support arm 125. The two support arms 125 accommodate a horizontally extending shelf 130. FIG. 19 shows the detailed arrangement of one of the support arms 125 to an enlarged scale. The same reference numerals are used to designate the same parts as in the embodiment of FIGS. 7 to 15.

In the embodiment of FIGS. 20 to 23 the lower two upper parts are provided with handtowel hooks 126 which, in the vicinity of the screw hole 120, project forwardly from the lower regions of the upper parts. In FIG. 23 the same reference numerals are used to designate the same parts as in the embodiment of FIGS. 7 to 15 however not all the reference numerals are shown in order to simplify the drawing.

FIG. 24 shows the simultaneous use of the invention with a fitting in accordance with FIGS. 1 to 6 and a mirror holder in accordance with FIGS. 7 to 15. The same reference numerals again designate the same parts as in the preceding embodiments. The pedestal lower part 11b has an extension 11a which runs parallel to the wall. In addition an upper part 112 which presses the mirror 117 against the extension 11a is held by the securing end part 27 on the pedestal lower part 11b i.e. on the lower part 111. The extension 111a is also provided with a self-adhesive layer 13 at its rear side, with the construction and function of this self-adhesive layer corresponding to the self-adhesive layer 13 on the pedestal lower part 11b. The plate member 113 which is arranged on the surface of the extension 11a which faces the mirror 117 is constructed, together with the self-adhesive layer 122 which faces the mirror 117 in the manner described above. In contrast to the above described arranged the alignment of the pedestal 11 relative to the wall is however carried out by means of the fitting 37 and not by means of the mirror 117.

The combined mirror holder/pedestal lower parts 11, 111 are only provided at the bottom and are provisionally inserted into the securing ends of the fitting 37 which is constructed as a handtowel rail or a mirror shelf. The fitting 37 is then pressed in the desired end position against the wall 12 so that the mirror holder/pedestal lower parts 11, 111 adhere firmly to the wall 12.

The fitting 37 is once again withdrawn forwardly and the screw holes 39 drilled through the lower parts 11, 111 which remain stuck to the wall 12. The lower parts of the pedestals 11b are then screwed tight together with the pedestal upper parts 11a. The mirror 117 is now placed in position. The upper holders 111, 112 are constructed in accordance with the embodiment of FIGS. 7 to 15 and mounted in corresponding manner. The mirror 117 must once again be removed so that the lower parts 111 at the top of the mirror can once again be attached to the wall with screws.

After the mirror 117 has been replaced the upper and lower upper parts 112 are placed in position and the fitting 37 is pressed onto the pedestal parts 11a whereupon the spring loaded pins 21 snap into engagement. The lower, upper parts 112 are fixedly trapped between the lower parts 11, 111 and the securing end parts 27 of the fitting 37. For this purpose the bore in the upper parts has a corresponding inner flange.

The mirror 117 is retained against the upper, lower parts 117 (which are not illustrated) in the same way as in the embodiment of FIGS. 7 to 15.

In this embodiment the invention is thus used twice, namely once for the attachment of a fitting and once for the attachment of a mirror, with the positioning of the lower holders 11, 111, 112 being carried out by the fitting 37 and the positioning of the upper holders 111, 112 (not illustrated in FIG. 24) being effected by the mirror 117.

I claim:

1. A method of attaching an article with one or more holders to a wall, the holder having a wall contact surface provided with a covered, self-adhesive layer and an aperture adapted to receive a member for mechanically connecting the holder to the wall, the method comprising steps of:

provisionally securing at least one holder to an article in the holder's intended permanent position on the article;

baring the covered, self-adhesive layer provided on the wall contact surface of the holder;

aligning the article carrying the provisionally secured holder in a predetermined position on the wall;

adhering the self-adhesive layer of the holder to the wall;

removing the aritcle from the holder such that the holder remains adhered to the wall in a position determined by the aligning and adhering steps;

drilling an attachment hole for the holder through the aperture into the wall by using each holder as a drilling jig;

attaching each holder to the wall with a mechanical fastening member extending through the aperture; and resecuring the article to each holder; whereby the article is firmly secured in the predetermined position on the wall.

2. A method of attaching an article to a wall according to claim 1 wherein an article is attached to a wall using at least two holders.

3. A method of attaching an article to a wall according to claim 1 wherein the resecuring step includes securing the article to each holder such that the fastening member attaching the holder to the wall is covered by the article to render it invisible and inaccessible.

4. A method of attaching an article with at least two holders to a wall, each holder having a wall contact surface provided with a covered, self-adhesive layer and an aperture adapted to receive a member for mechanically connecting the holder to the wall, the method comprising the steps of:

provisionally securing the holders to the article in each holder's intended permanent position on the article;

baring the covered, self-adhesive layer provided on the wall contact surface of each holder;

placing the article with the provisionally secured holders in a predetermined position on the wall;

adhering the self-adhesive layers of the holders to the wall;

removing the article from the holders such that each holder remains adhered to the wall in the position determined by the placing and adhering steps;

drilling an attachment hole for each holder through the aperture into the wall by using each holder as a drilling jig;

attaching each holder to the wall with a screw extending through the aperture; and resecuring the article to each holder; whereby the article is firmly secured in the predetermined position on the wall.

5. A method of attaching an article with at least one holder to a wall, each holder having a wall contact surface provided with a covered, self-adhesive layer and an aperture adapted to receive a member for mechanically connecting the holder to the wall, the method comprising the steps of:

positioning the holder in its intended permanent position within the article so that the article substantially fully covers the aperture and prevents access thereto from the exterior of the article;

provisionally securing the holder to the article in the holder's intended permanent position on the article;

baring the covered, self-adhesive layer provided on the wall contact surface of the holder;

placing the article with the provisionally secured holder in a predetermined position on the wall;

adhering the self-adhesive layer of the holder to the wall;

removing the article from the holder such that the holder remains adhered to the wall in the position determined by the placing and adhering steps;

drilling an attachment hole for the holder through the aperture into the wall by using each holder as a drilling jig;

attaching each holder to the wall with a screw extending through the aperture; and resecuring the article to each holder; whereby the article is firmly secured in the predetermined position on the wall and the article renders the screw invisible and inaccessible from the exterior of the article.

* * * * *